US009137479B2

(12) United States Patent
Kim

(10) Patent No.: US 9,137,479 B2
(45) Date of Patent: Sep. 15, 2015

(54) DISPLAY DEVICE, CONTROLLING METHOD FOR THE DISPLAY DEVICE AND STANDING APPARATUS

(75) Inventor: Mooyeon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 158 days.

(21) Appl. No.: 13/132,226

(22) PCT Filed: Dec. 22, 2008

(86) PCT No.: PCT/KR2008/007592
§ 371 (c)(1),
(2), (4) Date: Jun. 1, 2011

(87) PCT Pub. No.: WO2010/064758
PCT Pub. Date: Jun. 10, 2010

(65) Prior Publication Data
US 2011/0227967 A1    Sep. 22, 2011

(30) Foreign Application Priority Data
Dec. 5, 2008  (KR) .................. 10-2008-0123013

(51) Int. Cl.
| G09G 5/10 | (2006.01) |
| G09G 3/20 | (2006.01) |
| G09G 5/00 | (2006.01) |
| G09G 3/36 | (2006.01) |
| G09G 3/30 | (2006.01) |
| H04N 5/64 | (2006.01) |
| F16M 11/08 | (2006.01) |
| F16M 11/22 | (2006.01) |
| F16M 11/10 | (2006.01) |
| G09F 7/00 | (2006.01) |
| G09F 7/18 | (2006.01) |
| G09F 13/00 | (2006.01) |

(Continued)

(52) U.S. Cl.
CPC .............. H04N 5/64 (2013.01); F16M 11/08 (2013.01); F16M 11/22 (2013.01); *F16M 2200/08* (2013.01)

(58) Field of Classification Search
CPC .................................................. G09G 5/10
See application file for complete search history.

(56) References Cited
U.S. PATENT DOCUMENTS 2,347,665 A * 5/1944 Christensen et al. .......... 40/363
5,872,615 A * 2/1999 Harris, Jr. ....................... 352/25
6,273,577 B1 * 8/2001 Goto et al. ..................... 362/615

(Continued)

FOREIGN PATENT DOCUMENTS

EP          1978300 A1 * 10/2008 ............. G02B 6/00
KR    20-2000-0003285       2/2000

(Continued)

OTHER PUBLICATIONS

International Search Report issued in PCT Application No. PCT/KR2008/007592 dated Mar. 24, 2009.

(Continued)

*Primary Examiner* — Joseph Feild
*Assistant Examiner* — Karin Kiyabu
(74) *Attorney, Agent, or Firm* — KED & Associates LLP

(57) ABSTRACT

In order to the number where the display devices are used and to improve the convenience of use, there is provided a display device comprising: a display part emitting an image; and a standing apparatus supporting the display part, wherein a surface light source is provided in the standing apparatus.

11 Claims, 6 Drawing Sheets

(51) Int. Cl.
*C09K 19/08* (2006.01)
*C09K 19/12* (2006.01)

(56) References Cited

U.S. PATENT DOCUMENTS

| | | | |
|---|---|---|---|
| 2003/0038785 A1 | 2/2003 | Suzuki et al. | 345/168 |
| 2004/0156192 A1 | 8/2004 | Kerr et al. | 362/154 |
| 2005/0073517 A1 | 4/2005 | Wu et al. | 345/211 |
| 2006/0104084 A1* | 5/2006 | Amemiya et al. | 362/561 |
| 2006/0215386 A1* | 9/2006 | Hatanaka et al. | 362/29 |
| 2009/0310350 A1* | 12/2009 | Dalton et al. | 362/235 |

FOREIGN PATENT DOCUMENTS

| | | |
|---|---|---|
| KR | 10-2007-0101598 A | 10/2007 |
| KR | 10-2007-0101599 * | 10/2007 |
| KR | 10-2008-0056824 | 6/2008 |
| WO | WO 2007/117059 A2 | 10/2007 |

OTHER PUBLICATIONS

European Search Report dated Jun. 15, 2012 issued in Application No. 08 87 8611.
Korean Office Action dated Mar. 31, 2015 issued in Application No. 10-2008-0123013.

* cited by examiner

DISPLAY DEVICE, CONTROLLING METHOD FOR THE DISPLAY DEVICE AND STANDING APPARATUS

TECHNICAL FIELD

The present invention relates to a display device, a controlling method for the display and a standing apparatus.

BACKGROUND ART

A display device, which is a device through which a user views an image at home, has become an indispensable home appliance in the modern home.

In recent, an image quality of a display module applied to the display device has been somewhat improved so that a user hardly feels problems of viewing angle, brightness and afterimage, etc. Under the circumstance, user's selection of the display device depends on how conveniently the user can view the display device or how the user can feel more diverse satisfaction through the harmony with other surrounding environment on which the display device is installed, deviating from the original function of the display device through which the user views the image. For example, the image quality of the display module is indirectly improved by processing a front panel using a certain method or the display is connected to a home theater system, that is an external device, to be more harmonized in view of an image and an audio, thereby obtaining the environment that realization such as a theater can be transferred at home.

Considering the present as described above, the feature how to enhance the user's selectivity by how enhancing the user's selection and satisfaction has become one of the main research topics in the current display device industry.

DISCLOSURE OF INVENTION

Technical Problem

An object of the present invention is to enhance usability of a display device. In more detail, considering that the display device becomes a necessity at home and the display device is located in the living room, an object of the present invention is to provide a display device capable of providing a greater satisfaction to a user, a controlling method for the display device and a standing apparatus.

Since the display device is a device that implements an image, another object of the present invention is to provide a display device which a user can more conveniently use by applying a lighting apparatus that has neither been absolutely studied nor considered to the display device, a controlling method for the display device and a standing apparatus.

Technical Solution

In order to accomplish the objects, according to one aspect of the present invention, there is provided a display device comprising: a display part emitting an image; and a standing apparatus supporting the display part, wherein a surface light source is provided in the standing apparatus.

According to another aspect of the present invention, there is provided a standing apparatus comprising: a standing part including a surface light source, a standing part body provided in the inner side of the surface light source, and a light-emitting part light-emitting the surface light source; and a bottom part fastened to at least the standing part body and supporting the standing part.

According to another aspect of the present invention, there is provided a controlling method of a display device, which includes a display part emitting an image; a standing apparatus supporting the display part; and a surface light source provided in the standing apparatus, wherein the operation of the surface light source is changed in association with the display part.

Advantageous Effects

With the present invention, the user can use the display device more conveniently as the lighting apparatus.

BRIEF DESCRIPTION OF DRAWINGS

The above and other objects, features and advantages of the present invention will become apparent from the following description of preferred embodiments given in conjunction with the accompanying drawings, in which.

MODE FOR THE INVENTION

Hereinafter, preferred embodiments will be described in detail with reference to the accompanying drawings. The idea of the present invention is not limited to the embodiments set forth herein.

<First Embodiment>

Figure 1:
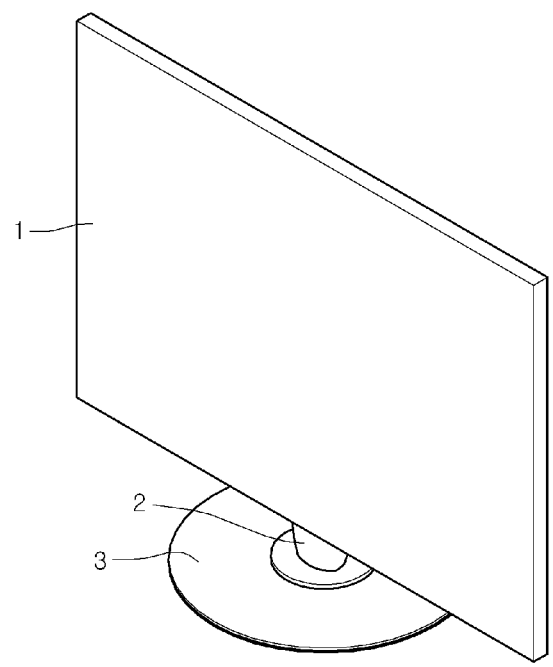
FIG. 1 is a perspective view of a display device.
Figure 2:
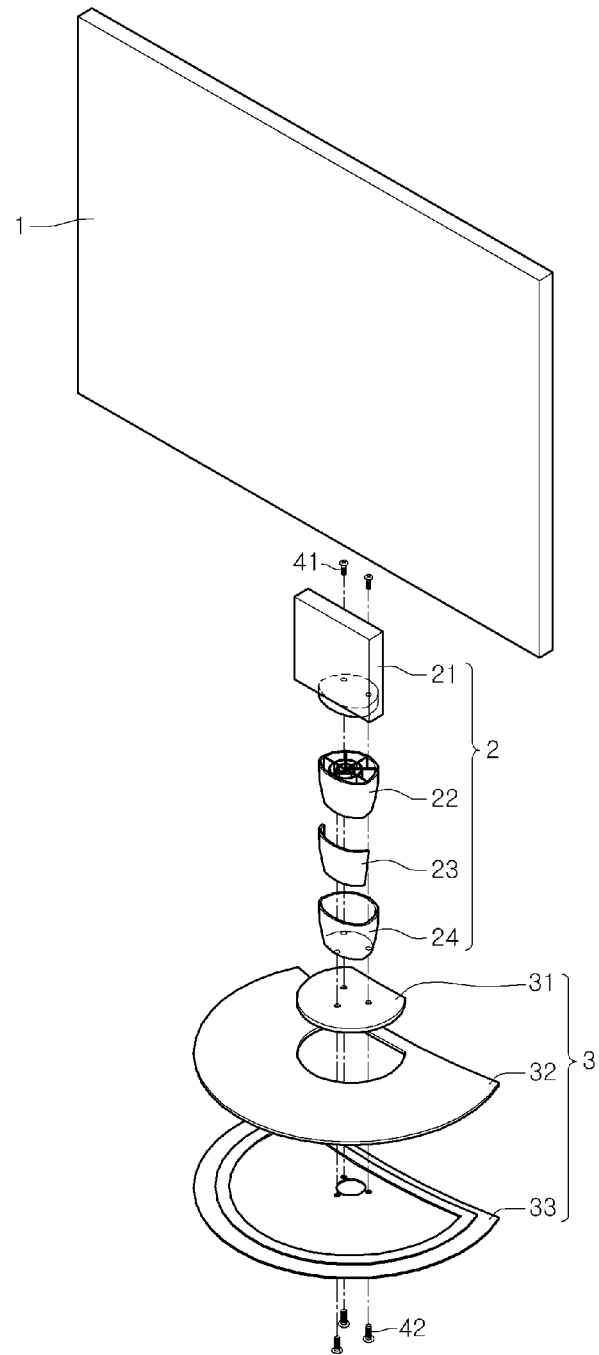
FIG. 2 is an exploded perspective view showing a display device in each constitutional part.

FIG. 1 is a perspective view of a display device, and FIG. 2 is an exploded perspective view showing a display device in each constitutional part.

Referring to FIGS. 1 and 2, the display device includes a display part 1 mounted with a display module in its internal to output an image, a standing part 2 supporting the display part 1 at a predetermined position, and a bottom part 3 supporting the standing part 2 against the bottom part. In the present embodiment, the standing part 2 and the bottom part 3 are given assuming that the display part 1 is supported by the horizontal bottom. If the display part 1 is not supported by the bottom surface, the standing part 2 may be supported by a wall surface and such a modified example may also be included in the idea of the present invention. Here, the standing part 2 and the bottom part 3 will be generally named as standing apparatus.

The bottom part 3 includes a metal base 33 supporting an entire load of the display device including the display part 1, a upper plate 32 provided on an upper side of the metal base 33, and a putting part 31 provided in a region of the upper plate 32 where the standing part 2 is supported.

The standing part 2 is the constitution for allowing the display part 1 to be put upward at a predetermined distance from the bottom part 3. The standing part includes a transparent body 24 provided on the putting part 31, a light-emitting body 23 provided in the inner side of the transparent body 24, a standing part body 22 put in the inner space of the transparent body 24 and maintaining stiffness required in the standing part 2, and a connector 21 connecting the standing part body 22 to the display part 1.

The connector 21 may be connected to the standing part body 22 by means of fasteners 41, and the supporting part and the bottom part 3 may be fixingly connected to each other by means of fasteners 42. The connector 21 may be fixed to the display part 1 in a manner that it is inserted into grooves of the display part 1 or in a manner that it is fastened to the display part 1 using separate fasteners.

As the transparent body 24, transparent or translucent resin material may be used and as the light-emitting body 23, a plate structure that is directly or indirectly light-emitted may be applied. Here, the transparent body 24 has an advantage to allow the display device to look more beautiful by giving the gloss to the front surface of the display device, and has an effect to allow the depth of the light light-emitted from the light-emitting body 23 to be deepened by being put in front of the light-emitting body 23. The light-emitting body 23 is applied with a light diffusion plate, making it possible to allow surface light to be uniformly light-emitted through the entirety of the light-emitting body 23, although the light is incident through any certain spots. Therefore, the surface light light-emitted from the light-emitting body 23 can be recognized by a user as more beautiful and clean light through the transparent body 24. Here, the tern transparent in the transparent body 24 include not only the substantial meaning of transmittance of 100% but also the transparent body that is recognized by general people as being some transparent.

The case when the surface light is light-emitted from the light-emitting body 23 based on the structure as described above will be compared with light provided in an operation part of a display device according to the prior art. Generally, the light provided in the operation part of the display device is recognized by the user as a standby signal informing that power is applied to the display device. However, the light to which a single LED is applied does not draw noticeability from the user so that the user frequently fails to see the light and the light is hardly noticed to lead many users who do not know the meanings of the light. To the contrary, with the structure where the surface light is output through the light-emitting body 23, the light is output through a large-area portion so that the noticeability for the light is enhanced and thus the light is recognized by the user, thereby improving the degree. And, the light emitted to the external lights a wide portion, making it possible to see the peripheral of the display device with naked eyes. Furthermore, as the recognisability of user and the illumination are improved, controlling methods for the diverse types of display devices to be implemented can thereby be performed. The controlling method of the display device will be described later in more detail.

Figure 3:
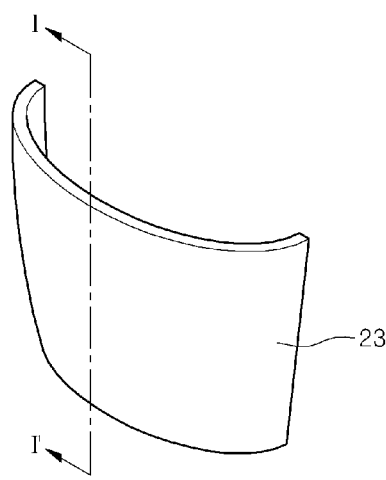
FIG. 3 is a perspective view shown an interrelation between a light-emitting body and a transparent body.
Figure 3:
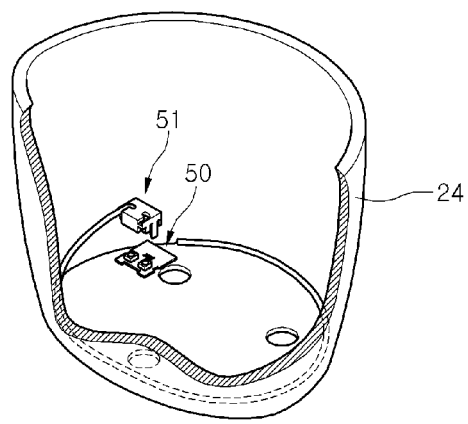

FIG. 3 is a perspective view shown an interrelation between a light-emitting body and a transparent body, wherein a portion of the transparent body is shown.

Referring to FIG. 3, a front view of the transparent body 24 is shown, wherein in a portion in front of the transparent body 24, corresponding to an inner surface, an outer surface of the light-emitting body 23 is put corresponding thereto to be fixed using an adhesion, etc. As another example, the light-emitting body 23 may be put in a position-fixation manner by being inserted between the standing part body 22 and the transparent body 24.

Figure 4:
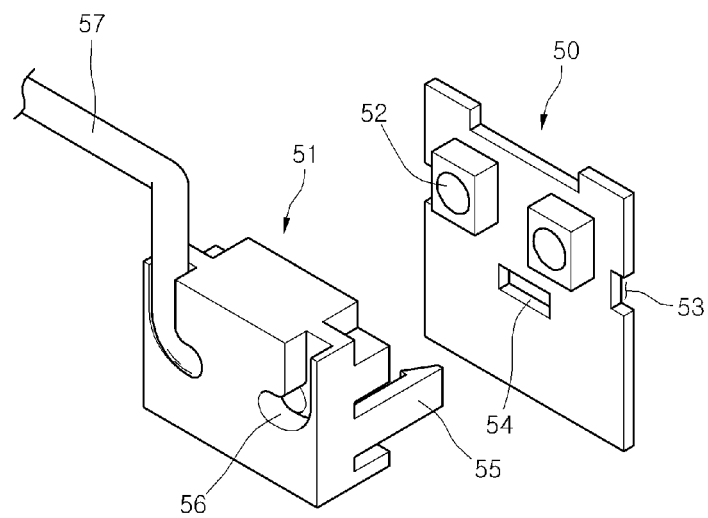
FIG. 4 is a view explaining a relative fastening structure between a light-emitting device and a lighting tube.

In the inner space of the transparent body 24, there are provided with a substrate 50 to which a light-emitting device (see 52 of FIG. 4) is mounted and a cover 51 guiding the light light-emitted from the light-emitting device 52 to a lighting tube (see 57 of FIG. 4). The lighting tube 57 is provided in a position corresponding to a lower edge of the light-emitting body 23 to light to be incident through at least a lower edge of the light-emitting body 23. The light-emitting body 23 receiving light incident through the lower edge emits the light to the external through the transparent body 24 put in front thereof. The lighting tube 57 and the light-emitting body 23, which are products manufactured in a predetermined shape by diffusing reflection material to transparent resin, serve to reflect the light incident on the internal by the reflection material to be emitted to the external.

The structure as described above may be understood in the manner that the light-emitting device 52 that is a dot light source is changed to a surface light source through the lighting tube 57 and then, is changed to a surface light source by means of the light-emitting body 23. Also, in FIG. 4, two light-emitting devices 52 shown as light-emitting diodes are in charge of the entire illumination light of the light-emitting body 23, however it is easily expected that at least three light-emitting devices are provided by applying the same manner, in order to enhance brightness. In this manner, as the dot light source is changed to the surface light source, even light not so bright is emitted over a large area, making it possible to sufficiently obtain the noticeability of user based on the large-area and the ability to light the surroundings as the illumination light.

During the process that the dot light source is changed to the surface light source, it is desirable that the light is emitted only towards by forming a reflection layer on a rear surface of the light-emitting body, in order to prevent the loss of light emitted in other directions. It is desirable that the light is emitted to the light-emitting body 23 by also forming a reflection layer on the lighting tube 57, on the opposite side facing the light-emitting body 23.

Figure 5:
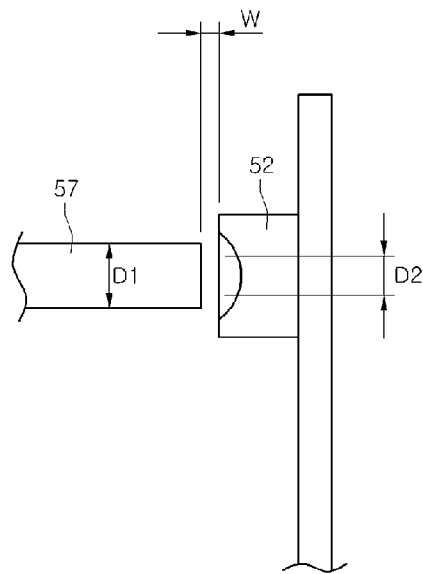
FIG. 5 is a schematic view explaining a position relation between a light-emitting device and a lighting tube.

FIG. 4 is a view explaining a relative fastening structure between a light-emitting device and a lighting tube, and FIG. 5 is a schematic view explaining a position relation between a light-emitting device and a lighting tube.

Referring to FIGS. 4 and 5, a substrate 50 fixed to the transparent body 24a and a cover 51 seated to the substrate are included. Latches 55 are formed in the cover 51, and grooves 53 are formed in the substrate 50. The latches 55 are inserted into the grooves 53 so that the substrate 50 can be stably fastened to the cover 51.

Light-emitting diodes 52 are installed on the substrate 50, and a lighting tube 57 is fixed to the cover 51. And, an end of the lighting tube 57 is arranged with the light-emitting diodes 52 so that the light light-emitted from the light-emitting diodes 52 can be stably projected onto the inside of the lighting tube 57. Here, the position of the lighting tube 57 can be stably maintained by guiding parts 56 formed in the cover 51. In other words, a pair of right and left guiding parts 56 allow both ends of the lighting tube 57 to be arranged with the emitting sides of the light-emitting diodes 52. In FIG. 4, reference numeral 54 not explained is a hole for allowing the substrate 50 to be fixed to the transparent body.

In order for the light emitted through the light-emitting diodes 52 to be projected onto the inside of the lighting tube 57 to be used as effective light, the relation of disposition and size therebetween should be considered.

First, the interval W between the end of the lighting tube 57 and the light-emitting diode 52 is set as 0.15~0.25 mm, most preferably, 0.2 mm.

If being larger than the area as described above, the light is not uniformly projected in the inside of the lighting tube 57 but a large quantity of light is emitted to the external on an entrance side of the lighting tube 57. Considering the Snell's Law that formed on the interface between the lighting tube 57 having a high density and the atmosphere having a low density, it will be easily understood that if the interval between the lighting tube 57 and the light emitting diode 52 is narrow, many portions of the light rightly incident onto the inside of the lighting tube 57 have a large incident angle to be incident onto the inside of the inside of the lighting tube 57, thereby being rightly emitted to the external of the lighting tube 57. To the contrary, if the interval between the lighting tube 57 and the light-emitting diode 52 is too wide, only a small portion of the light emitted from the light-emitting diode 52 is incident on to the lighting tube 57, having a problem that the loss of light is increased.

Also, it is desirable that the diameter D1 of a lighting tube and the diameter D2 of a emitting part of the light-emitting diode have the relation where D1:D2=(1.1:1.0~1.3: 1.0), more preferably, D1:D2=1.0. If the diameter of the lighting tube 57 is too large, the incident angle of the light mitted from the light-emitting diode 52 is too large to allow the light emitted to the external from the entrance of the lighting tube to be excessively enlarged so that it is not desirable. And, if the diameter of the lighting tube is too small, the light emitted from the light-emitting diode is not able to be incident onto the inside of the lighting tube but is disappeared to the external so that it is not desirable, either.

The embodiment under the circumstance as described above defines the optimal interrelation between the lighting tube and the light-emitting diode as proposed above.

Figure 6:
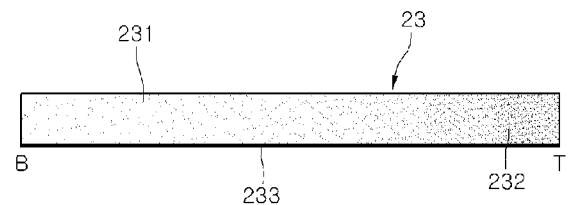
FIG. 6 is a cross-sectional view taken along lines I-I' of FIG. 3.

FIG. 6 is a cross-sectional view taken along lines I-I' of FIG. 3. Referring to FIG. 6, emitted light from the lighting tube 57 is incident through a lower edge of the light-emitting body 23, and the incident light is transmitted form a lose side B to a upper side A of the light-emitting body 23. At this time, in order for entire surface of the light-emitting body 23 to act as surface light, the transmittance of the light that may be strongly emitted closer to an incident side (lower end of the light-emitting body) is controlled to reach an upper end of the light-emitting body. To this end, the concentration of reflection material 232 included in a resin layer 231 forming mother material of the light-emitting body 23 is controlled, thereby making it possible to raise the concentration of the reflection material 232 closer to the upper side T from the lower side B of the light-emitting body 23. In this case, although a relatively large quantity of light passes through the lower side of the light-emitting body 23, a relatively small quantity of light is reflected, and although a relatively small quantity of light passes through the upper side of the light-emitting body 23, a relatively large quantity of light is reflected, such that the surface light can be entirely uniform.

Reference numeral 233 not explained, which is a reflective layer formed on a rear surface of the light-emitting body 23, is a portion provide to reduce light quantity projected onto the inside to be disappeared.

The control of the reflection material 22 as described above is for obtaining the uniform surface light source, and those skilled in the art can easily control it according to their tastes.

With the structure as described above, it can be clearly understood that the surface light source is provided to the stand supporting the display device. Hereinafter, a control method for the display device controlling the surface light source of the stand will be described.

Figure 7:
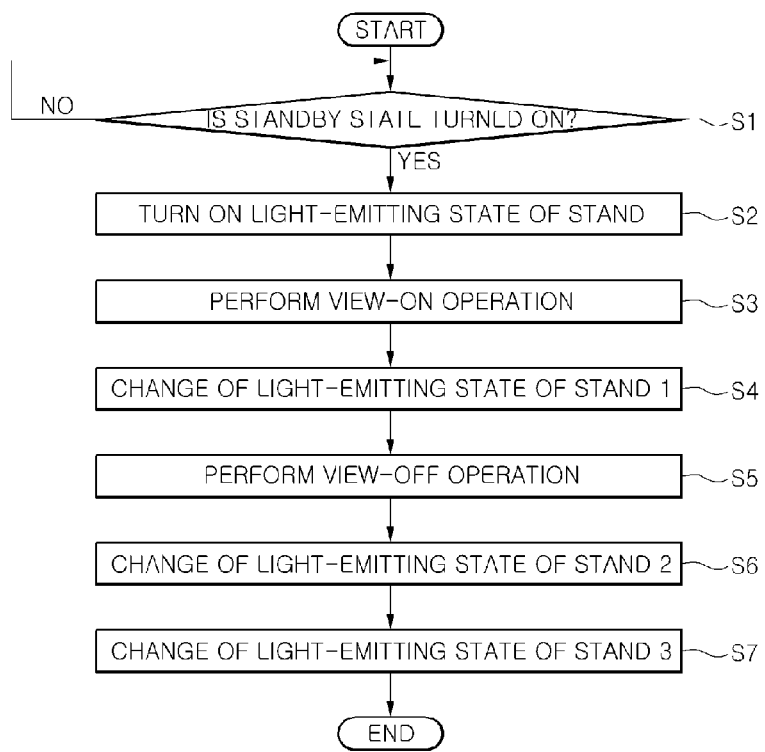
FIG. 7 is a flowchart explaining a controlling method for a display device.

FIG. 7 is a flowchart explaining a controlling method for a display device. Before explaining the controlling method for the display device, it is naturally expected that the light-emitting device 57 is a product that can be controlled by a central processing apparatus of the display device. The central processing apparatus of the display device can also naturally control the light-emitting device 57 in association with the entire operation state of the display device.

Referring to FIG. 7, it is determined whether a standby state where viewing is not made although power is connected to the display device, is turned on (S1), and if the display device is in a standby state, a light emitting state of a surface light source of the stand maintains a turn-on state (a first light emitting state) (S2). In a state where even power is not connected, the stand cannot be a light emitting state due to the absence of power. However, in the first light emitting state, somewhat weak light may be light-emitted, not being light-emitted at 100% outputs even in the light emitting state. In this state, a user can easily recognize that the power is input. And, the first light emitting state may be used as a mood light source weakly lighting an outer space on which the display device is mounted at night so that the user can conveniently approach the display device.

Thereafter, if the user performs a view-on operation in order to view the display device (S3), a display module mounted on the display device is turned on to output an image and the light emitting state of the stand becomes weak (a second light emitting state) (S4). The second light emitting state has light quantity smaller than that in the first light emitting state so that it is desirable not to be hindered in viewing the image output from the display module.

Thereafter, while being continuously operated, when power of the display device is turned off at a predetermined time point, the light emitting state of the stand is changed (a third light emitting state) (S6). The third light emitting state may be a light emitting state higher than the second light emitting state, for example, being a state output at 100%. Thereby, functions to confirm that the operation of the display device is ended and to light the surrounding environment to the user far away from the display device can be performed. Furthermore, the third light emitting state becomes lighter than the first light emitting state so that the function to light the surrounding environment can be fully implemented. After the third light emitting state is continued for a pre-determined time (time rendered when the user goes away from the display device, for example, fifteen seconds), the stand light emitting state is changed (a fourth light emitting state) (S7). The fourth light emitting state, which has light quantity similar to that in the first light emitting state, can be act as a dim mood illumination.

Meanwhile, although the display device is in the third light emitting state or in the fourth light emitting state, if physical power is blocked by a power plug, the stand is not light-emitted.

The controlling method for the display device as described above has been explained as being a single controlling method from start to end. However, the controlling method is not limited thereto but may be divided into a first controlling method covering S1 to S4, and a second controlling method covering S5 to S7.

More specifically, the controlling method for the display device from the standby state to a series of sequences that the user starts to view the display device is a controlling method in which the user can comfortably view the image without the hindrance by light, while easily recognizing the current state of the display device using the dim illumination. The controlling method for the display device forming a series of sequences that the user ends the viewing of the display device in the viewing state can form an illumination environment that the user can safely move from the display device, while recognizing the ending of the use of the display device, when the user who comfortably has comfortably viewed the display device moves away from the display device.

With the present embodiment, the operation state of the display device can be exactly recognized by means of the soft surface light source implemented in the stand of the display device and the illumination can be performed by the display device, making it possible to effectively use the lighting apparatus of the display device which has been inhibited due to the problem of visual disturbance in viewing the image.

The display device, the controlling method for the display device, and the standing apparatus described above are not limited to the description as described above, but may further have diverse modified examples. For example, in the aforementioned embodiment, the standing part 2 and the bottom part 3 have been described to be integrally fixed using a plurality of fasteners 42 having the same shape, however a structure in which the standing part 2 is rotatable to the bottom part 3 by interposing a hinge between the bottom part 3 and the standing part 2 can be provided, dependently or independently from the interposition of the fasteners 42. As the hinge structure, a resin plate may be used.

Also, in the aforementioned embodiment, the example where the surface light source is installed on the standing part 2 is described, however the surface light source may also be installed on the bottom part 3, not being limited thereto. However, in this case, the direction that the light emits will face the upper side so that it may not be desirable. However, the feature to disclose the lighting part being forcibly emitted from the bottom part to the upper side should be construed as included to the idea of the present invention.

The modified example included in the embodiment will be explained together with the drawings. With the modified example, only portions remarkably different will be explained and other portions with no concrete explanation will be considered to have the explanation for the embodiment as described above as it is and thus the detailed description thereof will be omitted. However, in the case when the embodiment is slightly modified within the obvious range in order to implement the modified example, the detailed description thereof will be omitted but the idea of the embodiment will be construed as obviously applied to thereto.

Figure 8:
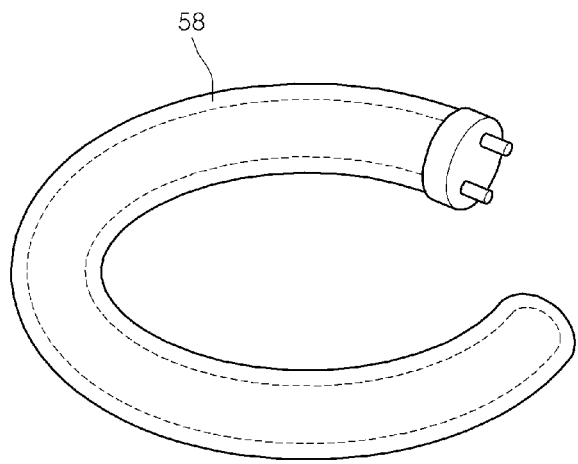
FIG. 8 is a view explaining an interrelation between a light-emitting body to which a line light source is applied as a light-emitting source and a transparent body.

FIG. 8 is a view explaining an interrelation between a light-emitting body to which a line light source is applied as a light-emitting source and a transparent body. In the modified example, it is described a case where other portions are the same as the embodiment, but the surface light source is used as a final light source providing light to the light-emitting body rather than the dot light source such as the light-emitting source. To use a fluorescent lamp 58 as a light source may be desirable in that the light quantity can be expanded, however may not be desirable in that it is weak against the external impact, the life time thereof is limited and the excessively large light quantity is rather hindered in viewing the display device. Merely, the use efficiency of the light will be definitely enhanced by forming the surface light source using the line light source instead of the dot light source.

The modified example and the present embodiment propose only the case where the light-emitting body is indirectly light-emitted by receiving the external light, however are not limited to such a case but may be light-emitted using another method. For example, when noctilucent material is diffused on the resin layer that is mother material of the light-emitting body 23, the light-emitting body 23 directly emits light, having an advantage that it can be used as an illumination light. However, it has disadvantages that the light is not able to be used at day and it is difficult to forcibly control the illumination light. Case by case, the light-emitting body 23 may be made by diffusing the noctilucent material together with the reflection material.

Figure 9:
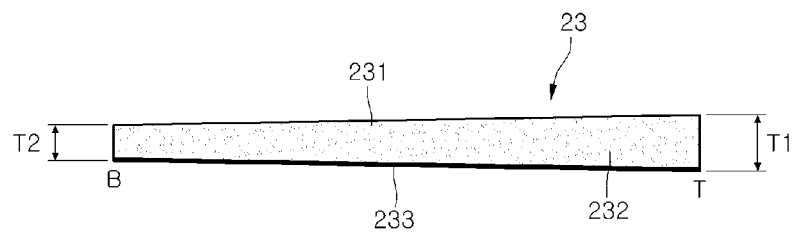
FIG. 9 is a cross-sectional view taken along lines I-I' of FIG. 3 according to a modified example.

As another modified example included in the present embodiment, a improving method of light quantity uniformity of surface light source implemented by the light-emitting body 23 will be described FIG. 9 is a cross-sectional view taken along lines I-I' of FIG. 3 according to the modified example. Referring to FIG. 9, the diffusion degree of the reflection material 232 included in the resin layer 231 provided as mother material of the light-emitting body 23 is the same, regardless of position differences. To the contrary, the thickness of the resin layer 231 becomes thicker as it goes from the lower side B to the upper side A of the light-emitting body 23. Thereby, as being closer to the upper side, more light is reflected to be emitted to the external, making it possible to improve a phenomenon that the light is emitted concentratedly to the external on the lower side.

In the case of the present modified example, it is expected to be applied when it is difficult to precisely control the content of the reflection material 232 diffused to the inside of the resin layer 231. In the case of the present modified example, the desired effects can be obtained by controlling only the thickness of the resin layer 231.

Figure 10:
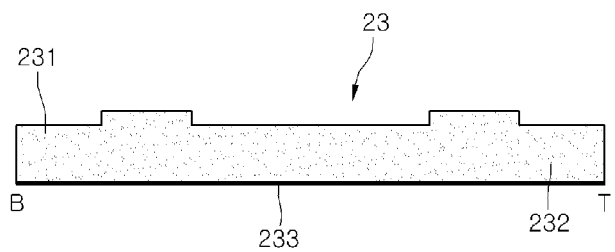
FIG. 10 is a cross-sectional view taken along lines I-I' of FIG. 3 according to another modified example.
Figure 11:
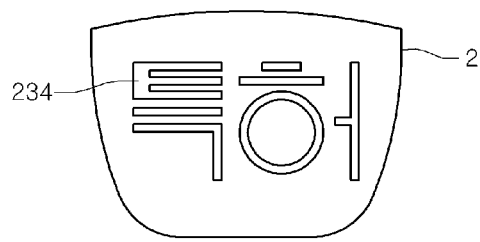
FIG. 11 is a view showing an example in which '특허' characters are inserted by being connected to a deformation part of FIG. 10.

FIG. 10 is a cross-sectional view taken along lines I-I' of FIG. 3 according to another modified example. Referring to FIG. 10, the diffusion degree of the reflection material 232 included in the resin layer 231 provided as mother material of the light-emitting body 23 is the same, regardless of position differences. And, there are deformation parts 234 deformed from other portions, by differing the thickness of the resin layer 231 in predetermined portions. If the deformation parts 234 have a thick shape as shown in the drawing, the deformation parts 234 become regions where more light is emitted compared to other portions. Therefore, predetermined symbols, characters, figures or other different patterns, etc. can be made on the light-emitting body 23 by connecting the deformation parts 234 to each other. FIG. 11 shows the example in which ' 특히 ' characters are made by connecting the deformation parts 234. Of course, the thickness of the deformation parts is partially differentiated for the single characters of ' 특히 ' (this is korean language for patent), making it possible to perform a partial emphasis, etc.

Dependently or independently from the formation of the deformation parts 234, a relatively large quantity of reflection material is included in the portions forming the deformation parts, making it possible to make the deformation parts 234 partially brighter. Also, walls are provided on the resin layer 231 between the respective deformation parts 234 conceptionally divided, making it possible to control the color of light affecting the respective deformation parts 234. At this time, the walls can be obtained by providing the resin layer 231 through a dual-injection in a state where articles forming the walls are put in a mold. In this connection, the portions where the deformation parts 234 are included, certain symbols, characters, figures and patterns are provided, and certain recognition is provided to the user, may be named as a recognition part.

<Second Embodiment>

The second embodiment is almost the same as the first embodiment but is different only in view of a manufacturing method of the light-emitting body and the transparent body and a coupling method thereof. Therefore, for the portions with no concrete description, the description of the first embodiment and their modified examples can be applied as it is.

Figure 12:
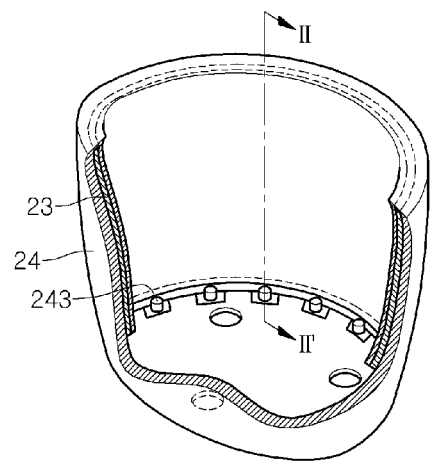
FIG. 12 is a partial break-away perspective view of a light-emitting body/transparent body assembly according to a second embodiment.
Figure 13:
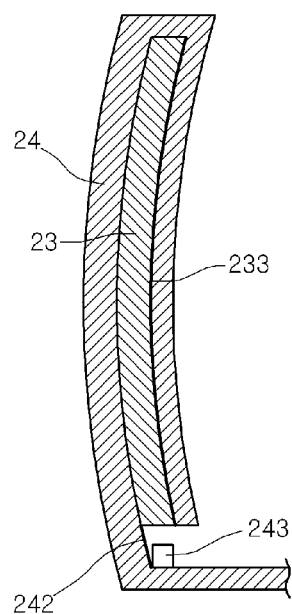
FIG. 13 is a cross-sectional view taken along lines II-II' of FIG. 12.

FIG. 12 is a partial break-away perspective view of a light-emitting body/transparent body assembly according to a second embodiment, and FIG. 13 is a cross-sectional view taken along lines II-II' of FIG. 12. Referring to FIGS. 12 and 13, in the second embodiment, when the light-emitting body 23 is molded in the transparent body 24, the light-emitting body 23 is injected in a state where it is inserted into the inside of the mold. In other words, in a state where the light-emitting body 23 that is provided as a diffusion plate is previously made, the light-emitting body 23 is put in the inside of the mold for the transparent body 24 and then the transparent body 24 is injected to be manufactured. Then, the light-emitting body can be fixed on the desired position.

FIG. 13 shows that the light-emitting body 23 is put in the inside of the transparent body 24 by way of example. And, the reflective layer 233 is provided in the inner-most side of the transparent body 24 allows the light returned by being projected onto the inside of the light-emitting body 23 not to be emitted to the inside of the transparent body 24.

Also, a groove is provided in the lower end of the transparent body 24 and a light-emitting device 243 is put on the groove so that light is emitted from the position where the light-emitting device 243 is put to the upward. Meanwhile, in order to block the emitted light from being incident on the transparent body 24 side rather than the light-emitting body 23, a reflective layer 242 may be provided on the transparent body 24 in front of the position where the light-emitting device 243 is put.

As the modified example included in the present embodiment, the position of the light-emitting body is regularly prescribed at the time of a dual-injection, making it possible for the user to recognize regular symbols or characters by means of the connection between the light-emitting bodies. At this time, the brightness of the light-emitting body can be more conveniently controlled by controlling the thickness of the light-emitting body.

Furthermore, dye having colors are put in a predetermined light-emitting body together with the reflection material, making it possible for the user to recognize the color implemented by the corresponding dye. As different colors are implemented, '득' characters and '히' characters, as shown in FIG. 11, can be implemented in different colors.

INDUSTRIAL APPLICABILITY

With the present invention, the display device allows the lighting apparatus to be operated corresponding to its own function so that the user can more conveniently use the display device. Therefore, the user's satisfaction and comfortable feeling can be more improved.

The invention claimed is:

1. A display device, comprising:
a display that displays an image; and
a stand that supports the display, wherein the stand includes:
a light-emitting diode that is a dot light source;
a surface light source that emits a surface light; and
a stand body provided inside of the surface light source, wherein the surface light source includes:
a light-emitting body having a laterally extending surface; and
a transparent body in front of the light-emitting body and having a space to receive the light-emitting body and the stand body therein and to protect the light-emitting body, wherein the transparent body transmits light from the light-emitting body externally, wherein the light-emitting body includes a resin layer, and a reflective layer formed on a rear surface of the resin layer,
wherein the stand further includes a lighting tube provided in a position corresponding to a lower edge of the light-emitting body, and
wherein the lighting tube changes the dot light source to the surface light,
wherein a thickness of the resin layer becomes thicker as the resin layer goes from a lower side to an upper side of the light-emitting body,
wherein the resin layer includes a reflection material, and
wherein a concentration of the reflection material at an upper side of the light-emitting body is larger than a concentration of the reflection material at a lower side of the light-emitting body such that an entire surface of the light-emitting body acts as the surface light.

2. The display device according to claim 1, wherein the stand further includes:
a bottom part that contacts an external support surface; and
a stand part that connects the bottom part of the stand to the display, wherein the stand part includes the light-emitting diode, the surface light source for emitting the surface light, and the stand body.

3. The display device according to claim 2, wherein the light-emitting body is fastened to an inner surface of the transparent body or is dual-injected at a time of an injection of the transparent body.

4. The display device according to claim 1, wherein in a region of the surface light source, a recognition part, in which symbols, characters, figures or patterns are implemented by differing at least one of brightness and colors, is provided.

5. The display device according to claim 4, wherein the recognition part is implemented by changing a shape of the light-emitting body.

6. The display device according to claim 1, wherein the surface light source is associated with the display so that an operation state thereof changes according to an operation of the display.

7. The display device according to claim 1, wherein an interval between the light-emitting diode and an end of the lighting tube is 0.15 mm-0.25 mm.

8. The display device according to claim 1, wherein an end of the lighting tube is arranged with the light-emitting diode.

9. The display device according to claim 1, wherein a diameter D1 of the lighting tube and a diameter D2 of an emitting part of the light-emitting diode have a relationship where D1:D2=(1.1:1.0- 1.3:1.0).

10. The display device according to claim 1, wherein the lighting tube includes a reflection layer formed on the lighting tube, on an opposite side facing the light-emitting body.

11. The display device according to claim 1, wherein the lighting tube is manufactured in a predetermined shape by diffusing reflection material to transparent resin.

* * * * *